April 21, 1953 — H. RUMSEY, JR — 2,635,672
APPARATUS FOR HEAT SEALING AND SEVERING THERMOPLASTIC MATERIALS
Filed Nov. 29, 1950 — 2 SHEETS—SHEET 1

INVENTOR.
Herbert Rumsey, Jr.
BY Duell & Kane
ATTORNEYS

April 21, 1953
H. RUMSEY, JR  
APPARATUS FOR HEAT SEALING AND SEVERING THERMOPLASTIC MATERIALS
2,635,672
Filed Nov. 29, 1950
2 SHEETS—SHEET 2
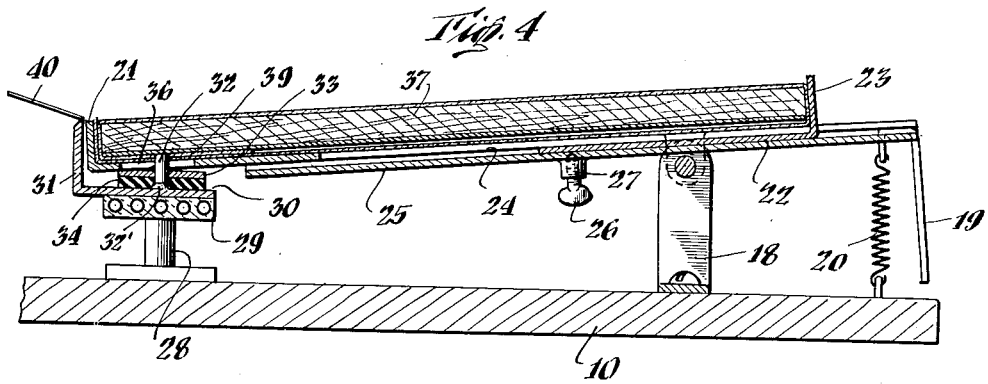
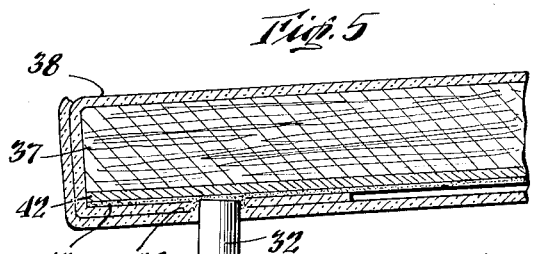
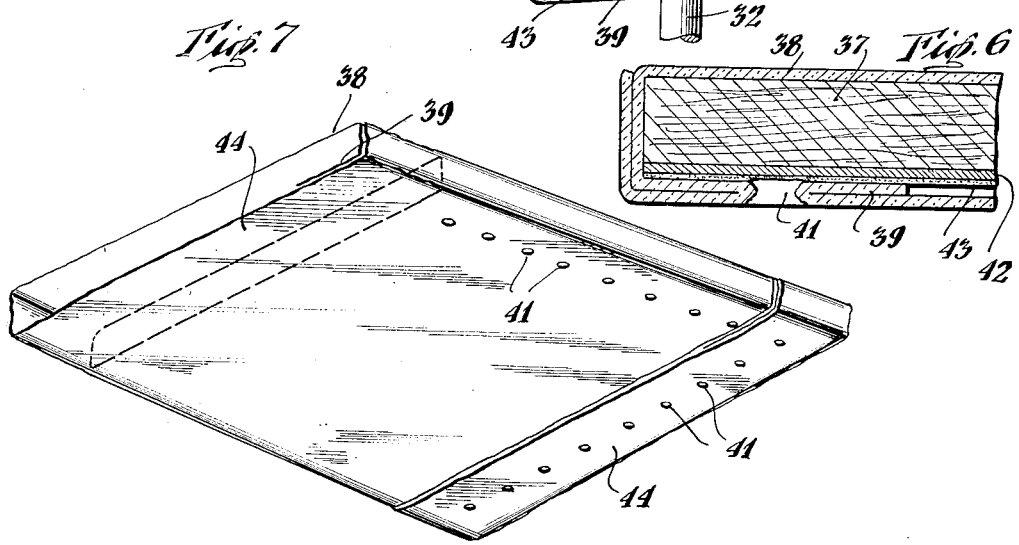
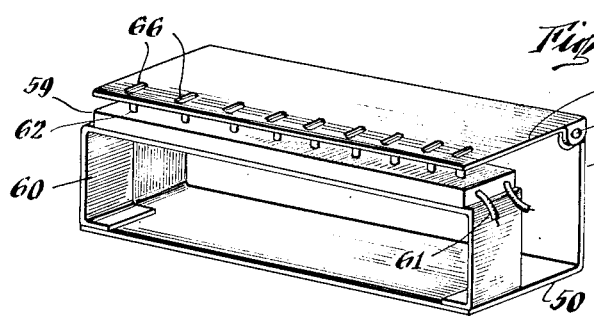
INVENTOR.  
*Herbert Rumsey, Jr.*  
BY *Duell & Kane*  
ATTORNEYS Patented Apr. 21, 1953

2,635,672

UNITED STATES PATENT OFFICE 2,635,672

APPARATUS FOR HEAT SEALING AND SEVERING THERMOPLASTIC MATERIALS

Herbert Rumsey, Jr., Rochester, N. Y.

Application November 29, 1950, Serial No. 198,107

11 Claims. (Cl. 154—42)

This invention relates to improved apparatus for heat sealing thermoplastic materials and has particular relation to apparatus for use in heat sealing thermoplastic sheet wrapping material in the wrapping of packages and in one form of my invention includes apparatus for severing the wrapping material from the supply strip.

It is an object of the invention to provide improved, relatively simple and inexpensive apparatus of the above character which can be readily used by relatively unskilled employees, in heat sealing thermoplastic wrapping material around a package. In this connection, difficulty is frequently encountered in heat sealing thermoplastic sheet materials since the temperature applied must be sufficient to fuse or seal the materials, while at the same time it must not be excessive so as to damage or even completely dissipate or destroy the thin wrapping material. By means of my present invention the thermoplastic sheet material is properly sealed around the package without the danger of damaging or destroying the material. At the same time, in one form of my invention the material wrapped around the package can be severed from the supply strip.

My invention also has the advantage that it provides a platform on which the package may be wrapped or partially wrapped and at a proper time in the wrapping sequence, by a simple manipulation, the material may be heat sealed and in one form may also be severed from the supply strip.

In the accompanying drawings

Fig. 4 is a longitudinal sectional view through the heat sealing platform showing it in depressed or heat sealing position;

Fig. 5 is a detail view showing the engagement between the package being wrapped and one of the heat sealing prongs;

Fig. 6 is a similar detail view showing the manner in which the thermoplastic wrapping material of the package is heat sealed or fused;

Fig. 7 is a perspective view of a partially wrapped package of the type which may be heat sealed by means of my apparatus; and Fig. 8 is a perspective view of modified apparatus embodying my invention.

Figure 1:
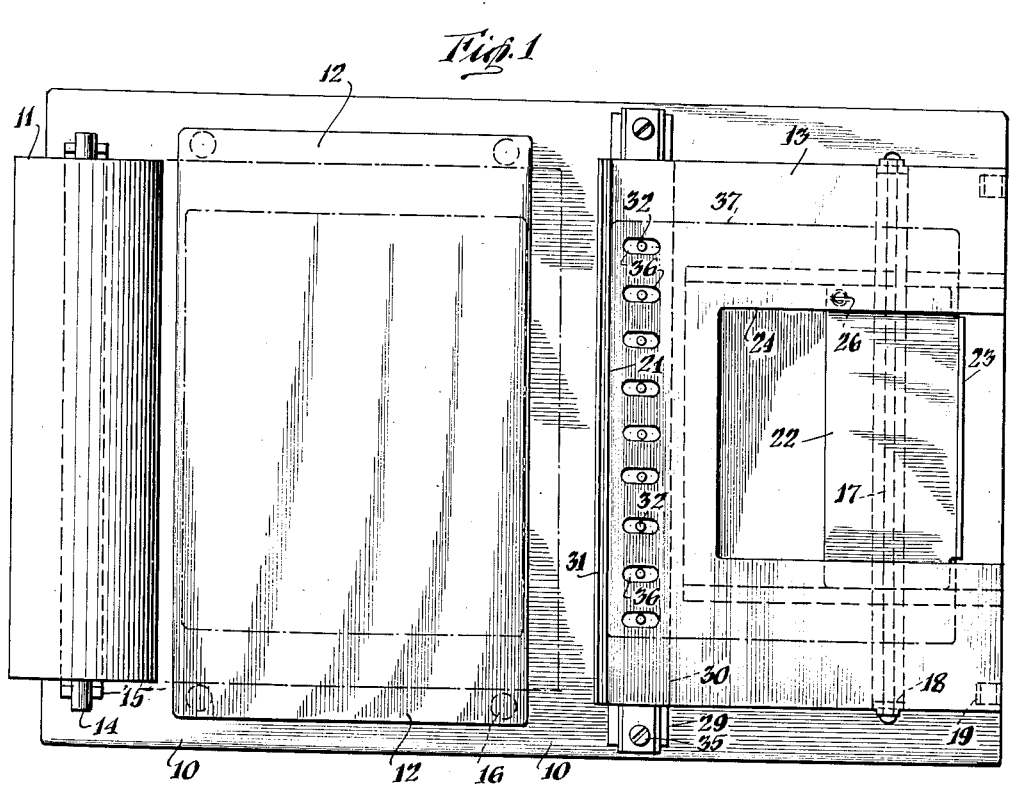
Fig. 1 is a top plan view of apparatus embodying my invention.

Referring to the first form of my invention, my apparatus comprises generally a base plate 10, a roll of thermoplastic sheet wrapping material 11 suitably mounted thereon, a wrapping platform 12 adjacent the roll of wrapping material and a heat sealing platen or platform 13 adjacent the wrapping platform.

The roll of thermoplastic sheet wrapping material is suitably supported as on shaft 14, resting in brackets 15 mounted on the support. The thermoplastic sheet material may be of any known type such as cellulose acetate or other cellulose esters, Pliofilm or polyvinyl films such as polyvinylidene chloride of the type available commercially under the trade name Saran.

The platform 12 is arranged at a convenient height and is supported from the base by suitable uprights 16.

The heat sealing platen or platform 13 is pivotally mounted as shown at 17 on uprights 18 which, in turn, are supported on the base. The pivotal mounting is preferably slightly to the right of the center of the platform as viewed in Figs. 1 and 2. So that the platform 13 may normally be held in horizontal position I provide the right-hand end of the platform with a pair of depending legs 19 of the proper length to engage the base when the platform is in horizontal position and a pair of helical springs 20 extending between the undersurface of the platform and the base. The springs are so designed as to normally maintain the platform in horizontal position, as shown in full lines in Fig. 2, but so that the left end of the platform may be tilted downwardly against the force exerted by the spring to the position shown in dotted lines in Fig. 2.

So as to facilitate the proper positioning of the package being wrapped on the platform 13 I provide the forward end with an upturned flange as shown at 21 and the right-hand end with an adjustable slide 22 also provided with a package engaging upturned flange 23. In this connection, it should be noted that a central aperture 24 is provided in the platform 13 in which the slide 22 is disposed. The flange 23 extends for substantially the entire width of the aperture 24 and projects upwardly therethrough. The base of slide 22 is of greater width than aperture 24 and is disposed beneath platform 13 resting upon bed plate 25. It will thus be seen that the slide may be shifted to the left or to the right so as to vary the size of the package-supporting space in accordance with the dimension of the package being wrapped. The slide may be retained in adjusted position as by means of a thumb screw 26 threaded through the collar 27 in bed plate 25 and engageable with the undersurface of the slide towards one side thereof so as to press it into frictional engagement with the undersurface of the platform.

Figure 2:
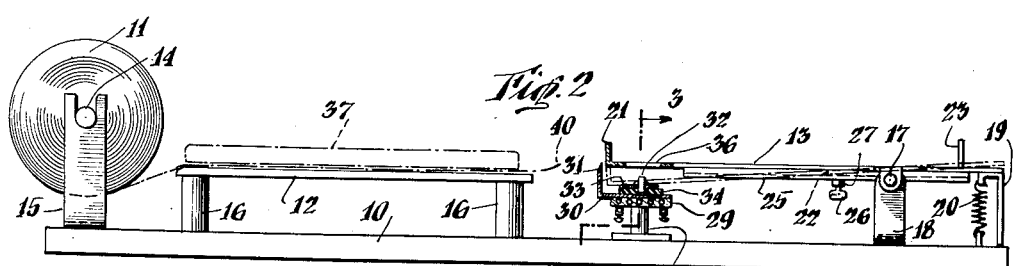
Fig. 2 is a sectional view of the apparatus from the side thereof.

The heat sealing and severing mechanism is disposed adjacent the forward or leading end of the heat sealing platform 13 and is suitably supported by standards 28. It consists of a suitable electric heating element 29 which may be suitably connected to a source of electric current. Resting on the electric heating element is a metal plate 30 made of good thermo-conducting material such as copper. The plate 30 is formed with an integral upturned flange or blade 31 which is preferably formed with a straight relatively narrow upper edge. Blade 31 is so arranged that when the platform 13 is in horizontal position the upper edge of flange 21 projects above the severing blade as shown in Fig. 2. However, when it is depressed in the manner shown in Fig. 4 blade 31 projects substantially above flange 21.

Figure 3:
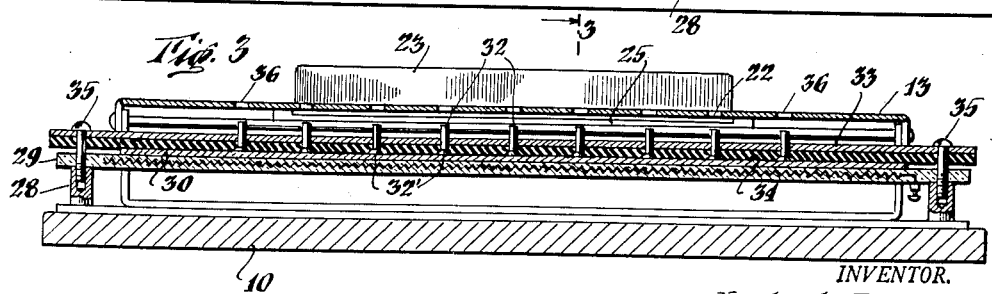
Fig. 3 is a sectional view on the line 3—3 of Fig. 2.

Resting upon the plate 30 and in heat transfer relation therewith are the heads 32' of a plurality of heat sealing prongs 32 made of good heat conducting material such as copper. The prongs are arranged in a row in spaced relationship as shown in Figs. 1 and 3. The prongs are carried by a plate 33 which rests on a strip of asbestos or other heat insulating material 34 which, in turn, is supported on metal strip 30. The heads 32' hold the prongs in place and insure close-fitting relation with the plate 30. The entire heat sealing assembly is retained together by means of screws 35 passing through the several strips into the standards 28.

The prongs 32 are of such a length as to normally be spaced from the undersurface of platform 13 when it is in horizontal position as shown in Figs. 2 and 3. However, when the leading end of the heat sealing platform is depressed into engagement with the heat sealing assembly the prongs 32 project upwardly through openings 36 formed in the platform and engage the package disposed thereon.

In using my apparatus, electric heater 29 is connected to a source of electric current and the heat is controlled either manually or by well-known thermostatic means so that the prongs 32 and the upper edge of heat severing blade 31 are at a temperature to fuse the thermoplastic wrapping material but so that the platen 13 and plate 33 are not hot enough to fuse the material. The package may first be partially wrapped in the thermoplastic sheet material on wrapping platform 12 as indicated in Figs. 1 and 2. When the package has been partially wrapped in this manner it may then be transferred to the heat sealing platform 13 as shown at 37 in Fig. 4 to complete the wrapping and sealing operations. In this connection, the slide 22 should first be adjusted to a position so that the package may be comfortably fitted between the flanges 21 and 23. The operator may thus shift one edge of the package against the flange 23 and permit the remainder of the package to drop downwardly against the surface of platform 13.

The package 37 should be placed upon platform 13 so that the overlapping edges of the thermoplastic wrapping material 38 are disposed over the apertures 36 as indicated at 39 and preferably so that the strip of wrapping material 40 extends outwardly from the edge of the package.

When downward pressure is applied to the leading end of the platform or to the package 37, it causes the package and platform to tilt downwardly to the position indicated in Fig. 4 with the result that the strip 40 of thermoplastic wrapping material engages the upper edge of severing flange 31 and it is heat severed or fused at once. Simultaneously, the prongs 32 engage the surface of the package forming apertures 41 through both layers of the wrapping material 38 in the manner shown in Figs. 4, 5 and 6. These apertures are melted or fused through the layers of material. This action causes fusing of the peripheral edges of the underlying layers around the openings. The apertures are withdrawn from engagement with the prongs at the time that the pressure on the platform is released and it returns to horizontal position with the result that the fused or melted plastic material sets or hardens and the overlapping layers are welded or fused together around the apertures in the manner indicated in Fig. 6. Since there are a plurality of prongs 32 all formed in the same manner it will be appreciated that the overlapping layers will be fused together at a plurality of spaced points.

It is frequently desirable that a package wrapped in my apparatus should be provided with a relatively stiff support such as a sheet of cardboard 42 along the bottom of the package inside the wrapping and this support may be provided with a thermoplastic coating 43 of wax or thermoplastic resin. When a support of this type is employed, the prongs also cause partial fusing or melting of the thermoplastic coating 43. However, this fusing or melting is not sufficient to seal the edges of the apertures to the support 42 when the plastic material sets or hardens. When the one end of the package has been secured in this manner, the protruding side edges 44 may be folded under in the manner shown at the right-hand end of Fig. 7 and heat sealed in similar fashion. In this connection any number of layers may be overlapped and heat fused or sealed in the manner herein described since the prongs will penetrate all of the thermoplastic layers causing fusing or sealing around the edges of the apertures.

When the package has been completely sealed, it may either be used in that form or, if the sheet material is of the type which may be heat shrunk such as polyvinyl resin, then it may be subjected to moderate heat, lower than the fusing point of the plastic material, so as to shrink the wrapping material around the package eliminating wrinkles and presenting a neat, attractive appearance.

A modified form of heat sealing apparatus is shown in Fig. 8 in which no heat severing blade is provided. This apparatus may be of relatively small size and may eliminate the wrapping platform. Thus, it may consist of a base 50 having a heat sealing platen 53 hinged at 57 to the upright forward edge 58 of the base as by means of a spring hinge which normally holds the platen in horizontal position but permits it to be tilted downwardly when force is applied thereto in the same manner that platform 13 may be tilted downwardly.

A suitable electric heating element 59 is supported by uprights 60 and may be connected to a source of electric current by leads 61. Supported on and projecting upwardly from the heating element 59 are the prongs 62 which correspond in function and structure to the prongs 32 and are adapted to project through the apertures 66 when platen 53 is depressed in the same manner that the prongs 32 project through the apertures 36.

In using the apparatus shown in Fig. 8, the heat element is connected to a suitable source of electric current and its temperature is controlled either manually or by well-known thermostatic means so that the prongs 62 are of a temperature to fuse or melt the thermoplastic sheet wrapping material when brought into contact therewith. The apparatus may then be used in the same manner as the heat sealing mechanism in the first form of my apparatus to cause heat sealing of thermoplastic wrapping material at a plurality of spaced points.

The apparatus shown in Figs. 1 to 6 inclusive may be so arranged that the blade 31 will be held at a relatively higher temperature than the upper ends of the prongs 32 so that the blade will readily melt or fuse the film to cause its severance, but so that the prongs will not form apertures completely through the material but will only cause spot adhesions similar to spot welding. This can be accomplished by making the prongs 32 of a material which does not conduct heat as well as the blade, as for instance by making the blade of copper and the prongs of a ferrous material. It can also be accomplished by reducing the diameter of the prongs 32 or by reducing the size of the heads 32'.

It will thus be seen that I have provided improved apparatus for heat sealing thermoplastic sheet material particularly for sealing thermoplastic wrapping material around a package. It will also be seen that the apparatus may be provided with a heat severing blade for severing the material wrapped around the package from the supply strip. My apparatus is of relatively simple and inexpensive construction and may be readily used by relatively unskilled employees to properly seal thermoplastic wrapping material around a package without damaging or destroying the material.

Modifications may be made in the illustrated and described embodiments of my invention without departing from the invention as set forth in the accompanying claims.

I claim:

1. Apparatus for heat sealing thermoplastic wrapping material around a package or the like comprising: a supporting member; a heat sealing member fixedly mounted on the supporting member; means for heating the heat sealing member; a platen for supporting a package and arranged with an opening to accommodate the heat sealing member; and means for supporting the platen on the supporting member in relatively shiftable relationship so that the platen can be shifted from inoperative position with the opening spaced above the heat sealing member to operative position with the heat sealing member projecting through the opening in the platen.

2. Apparatus for heat sealing thermoplastic wrapping material as set forth in claim 1 in which an adjustable stop for a package is provided on the platen in spaced relationship from the opening.

3. Apparatus for heat severing thermoplastic sheet material comprising: an elongated blade; means for heating the blade; a platen for supporting a length of thermoplastic sheet material and having an edge portion adjacent the blade; and means for supporting said platen and said blade in relatively shiftable relation so that they can be shifted from inoperative position with the edge portion spaced above the blade to operative position with the edge portion disposed below the upper edge of the blade.

4. Apparatus for heat severing thermoplastic sheet material comprising: a supporting member; an elongated heat severing blade fixedly mounted on said supporting member; a platen disposed with an edge portion adjacent said blade; and means for shiftably mounting the platen on said supporting member so that the platen can be shifted from inoperative position with the edge portion disposed above the blade to operative position with the said edge portion disposed below the upper edge of the blade.

5. Apparatus for heat severing thermoplastic sheet material as set forth in claim 4 in which the means for shiftably mounting a platen comprises a pivotal mounting spaced from the blade.

6. Apparatus for heat sealing and severing thermoplastic wrapping material which has been wrapped around a package or the like comprising: a heat sealing member; an elongated heat severing blade disposed adjacent the heat sealing member; means for heating the prong and the blade; a platen for supporting the package and wrapping material wrapped therearound and arranged with an opening in alignment with the heat sealing member and an edge portion adjacent said blade; and means for supporting the platen and said heat sealing member and blade in relatively shiftable relation so that they can be shifted from inoperative position with the heat sealing member spaced from the opening in the platen and with the edge portion of the platen positioned above the blade to operative position with the heat sealing member projecting through the opening and the edge portion of the platen positioned below the upper edge of the blade.

7. Apparatus for heat sealing and severing thermoplastic wrapping material which has been wrapped around a package or the like comprising: a supporting member; a plurality of heat sealing prongs fixedly mounted on the supporting member; an elongated heat severing blade fixedly mounted on the supporting member adjacent the prongs; a platen for supporting a package and the wrapping material wrapped therearound and provided with openings in alignment with the heat sealing prongs and with an edge portion adjacent the blade; and means for shiftably mounting the platen on the supporting member so that it can be shifted from inoperative position with the openings spaced above the prongs and the edge portion spaced above the blade to operative position with the prongs projecting through the openings and the edge portion disposed beneath the upper edge of the blade.

8. Apparatus for heat sealing and severing thermoplastic wrapping material as set forth in claim 7 in which the means for shiftably mounting the platen consists of a hinged mounting spaced from the heat sealing prongs and the elongated heat severing blade.

9. Apparatus for heat sealing and severing thermoplastic wrapping material which has been wrapped around a package or the like comprising: a supporting member; a heating element mounted on the supporting member; an elongated heat severing blade made of heat conducting material mounted on the supporting member and having a portion in heat transfer relation with the heating element; a heat sealing member mounted on the supporting member in heat transfer relation with the elongated heat severing blade; a platen for supporting a package and formed with opening for accommodating the heat sealing member and with an edge portion disposed adjacent the elongated heat severing blade and means for supporting the platen on the supporting member so that it can be shifted from inoperative position with the opening spaced above the heat sealing member and the edge portion positioned above the blade to operative position with the heat sealing member projecting through the opening and the edge portion positioned beneath the upper edge of the blade.

10. Apparatus for heat sealing thermoplastic wrapping material around a package or the like comprising: a supporting member; a heat sealing member fixedly mounted on the supporting member; means for heating the heat sealing member; a platen for supporting a package arranged with an opening to accommodate the heat sealing member; and means for pivotally mounting the platen on the supporting member at a point spaced from the heat sealing member so that the platen may be shifted from inoperative position with the opening spaced above the heat sealing member to operative position with the heat sealing member projecting through the opening.

11. Apparatus for heat sealing thermoplastic wrapping material around a package or the like as set forth in claim 10 in which means are provided for normally maintaining the platen in inoperative position with the opening spaced above the heating prongs.

HERBERT RUMSEY, Jr.

References Cited in the file of this patent

UNITED STATES PATENTS

| Number | Name | Date |
|---|---|---|
| 2,232,640 | Schwartzman | Feb. 18, 1941 |
| 2,414,157 | Marziani | Jan. 14, 1947 |
| 2,557,975 | King | June 26, 1951 |